(12) United States Patent
Satrijo et al.

(10) Patent No.: US 9,695,343 B2
(45) Date of Patent: Jul. 4, 2017

(54) HOT MELT PROCESSABLE PRESSURE SENSITIVE ADHESIVES CONTAINING FIBROUS MATERIALS

(75) Inventors: Andrew Satrijo, St. Paul, MN (US); Megan P. Lehmann, Stillwater, MN (US); Nathan B. Fong, Woodbury, MN (US); Craig E. Hamer, Woodbury, MN (US); John R. Jacobsen, Woodbury, MN (US); Mark F. Ellis, St. Paul, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 118 days.

(21) Appl. No.: 13/876,605

(22) PCT Filed: Sep. 23, 2011

(86) PCT No.: PCT/US2011/052941
§ 371 (c)(1),
(2), (4) Date: Mar. 28, 2013

(87) PCT Pub. No.: WO2012/044528
PCT Pub. Date: Apr. 5, 2012

(65) Prior Publication Data
US 2013/0184393 A1    Jul. 18, 2013

Related U.S. Application Data

(60) Provisional application No. 61/388,058, filed on Sep. 30, 2010.

(51) Int. Cl.
| | | |
|---|---|---|
| C08L 1/02 | (2006.01) |
| C08L 67/04 | (2006.01) |
| C09D 133/08 | (2006.01) |
| C09D 133/10 | (2006.01) |
| C08L 77/00 | (2006.01) |
| C09J 133/06 | (2006.01) |
| C08L 33/04 | (2006.01) |

(52) U.S. Cl.
CPC ............ *C09J 133/06* (2013.01); *C08L 33/04* (2013.01); *C08L 2205/16* (2013.01)

(58) Field of Classification Search
CPC .... C08K 3/10; C08K 3/22; C08K 3/40; C08L 1/02; C08L 67/04; C08L 77/00; C08L 89/04; C08L 2205/16
See application file for complete search history.

(56) References Cited

U.S. PATENT DOCUMENTS

| | | | |
|---|---|---|---|
| RE24,906 E | 12/1960 | Ulrich | |
| 3,062,683 A | 11/1962 | Kalleberg et al. | |
| 4,181,752 A | 1/1980 | Martens et al. | |
| 4,219,458 A * | 8/1980 | Donermeyer | C09J 5/06 523/220 |
| 4,329,384 A | 5/1982 | Vesley et al. | |
| 4,330,590 A | 5/1982 | Vesley | |
| 4,439,482 A | 3/1984 | Suematsu | |
| 4,557,960 A | 12/1985 | Vernon et al. | |
| 4,578,302 A | 3/1986 | Schmidt, Jr. et al. | |
| 4,737,559 A | 4/1988 | Kellen et al. | |
| 5,124,194 A * | 6/1992 | Kawano | D01D 5/36 428/373 |
| 5,804,610 A * | 9/1998 | Hamer et al. | 522/182 |
| 6,294,249 B1 | 9/2001 | Hamer et al. | |
| 6,756,098 B2 * | 6/2004 | Zhou et al. | 428/40.1 |
| 2003/0099780 A1 | 5/2003 | Christ et al. | |
| 2004/0241417 A1 | 12/2004 | Fischer et al. | |
| 2005/0170164 A1 | 8/2005 | Christ et al. | |
| 2005/0209380 A1* | 9/2005 | Wada et al. | 524/270 |
| 2007/0276108 A1 | 11/2007 | Hyde et al. | |
| 2009/0075052 A1 | 3/2009 | Hopf | |
| 2011/0104486 A1 | 5/2011 | Ma et al. | |

FOREIGN PATENT DOCUMENTS

| | | |
|---|---|---|
| EP | 0 147 093 | 7/1985 |
| JP | H08-325532 | 12/1996 |
| JP | 2008-094963 | 4/2008 |
| WO | WO 02/081586 | 10/2002 |

OTHER PUBLICATIONS

PCT International Search Report for PCT/US2011/052941 mailed Mar. 15, 2012, 4 pages.

* cited by examiner

*Primary Examiner* — Karuna P Reddy
(74) *Attorney, Agent, or Firm* — Philip Y. Dahl; Dena Ehrich; Jeffrey M. Olofson

(57) ABSTRACT

The methods of preparing hot melt processable pressure sensitive adhesives include combining an elastomeric (meth)acrylate random copolymer and a discontinuous fibrous material in a hot melt mixing apparatus, and mixing to form a hot melt processable pressure sensitive adhesive. The elastomeric (meth)acrylate random copolymer may be contained within a thermoplastic pouch, and the hot melt mixture may include a relatively high level of tackifying resin. The elastomeric (meth)acrylate random copolymer may contain branching agents and photosensitive crosslinking agents. The hot melt processable pressure sensitive adhesives can be used to prepare transfer tapes.

20 Claims, No Drawings

HOT MELT PROCESSABLE PRESSURE SENSITIVE ADHESIVES CONTAINING FIBROUS MATERIALS

FIELD OF THE DISCLOSURE

The present disclosure relates generally to the field of adhesives, more specifically to the field of pressure sensitive adhesives and tapes and articles prepared therefrom, especially hot melt processable pressure sensitive adhesives that contain fibrous materials.

BACKGROUND

Adhesives have been used for a variety of marking, holding, protecting, sealing and masking purposes. Adhesive tapes generally comprise a backing, or substrate, and an adhesive. One type of adhesive, a pressure sensitive adhesive, is particularly preferred for many applications.

Pressure sensitive adhesives are well known to one of ordinary skill in the art to possess certain properties at room temperature including the following: (1) aggressive and permanent tack, (2) adherence with no more than finger pressure, (3) sufficient ability to hold onto an adherend, and (4) sufficient cohesive strength to be removed cleanly from the adherend. Materials that have been found to function well as pressure sensitive adhesives are polymers designed and formulated to exhibit the requisite viscoelastic properties resulting in a desired balance of tack, peel adhesion, and shear strength. The most commonly used polymers for preparation of pressure sensitive adhesives are natural rubber, synthetic rubbers (e.g., styrene/butadiene copolymers (SBR) and styrene/isoprene/styrene (SIS) block copolymers), various (meth)acrylate (e.g., acrylate and methacrylate) copolymers and silicones. Each of these classes of materials has advantages and disadvantages.

SUMMARY

The present disclosure describes hot melt processable pressure sensitive adhesives and methods of preparing hot melt processable pressure sensitive adhesives. The methods of preparing hot melt processable pressure sensitive adhesives comprise providing a hot melt mixing apparatus, providing an elastomeric (meth)acrylate random copolymer, providing a discontinuous fibrous material, adding the elastomeric (meth)acrylate random copolymer, and discontinuous fibrous material to the hot melt mixing apparatus to prepare a hot melt processable mixture, mixing the hot melt processable mixture to form a hot melt blend, removing the blend from the hot melt mixing apparatus, and forming a hot melt processable pressure sensitive adhesive. In some embodiments, the elastomeric (meth)acrylate random copolymer is contained within a thermoplastic pouch. Some embodiments further comprise adding at least one tackifying resin to the hot melt blend, including in some embodiments a relatively high level of tackifying resin such as greater than 50 parts by weight per 100 parts by weight of elastomeric (meth)acrylate random copolymer.

Also disclosed are adhesives. The adhesives comprise a hot melt mixed blend, the hot melt blend comprising a hot melt processable elastomeric (meth)acrylate random copolymer within a thermoplastic pouch, and a discontinuous fibrous material, wherein the adhesive comprises a hot melt processable pressure sensitive adhesive.

DETAILED DESCRIPTION

Many classes of pressure sensitive adhesive are provided as solutions, often solutions containing large amounts of solvents. Upon coating or dispensing, the solvent needs to be removed to produce an adhesive layer. Often the solvent is removed through the use of elevated temperature processing such as heating with an oven. Such solvent removal steps can add cost to the formed articles because solvent removal requires additional steps. Not only are additional steps involved, often these steps require specialized care, precautions and equipment because the solvents are volatile and generally flammable. In addition, shipment of adhesive solutions adds additional expense because of the added weight of solvent and may require special shipment precautions due to the presence of solvent. Environmental concerns are also an issue with solvent borne adhesive systems, since, even with the use of solvent reclamation equipment, solvent release to the environment is likely.

Therefore, 100% solids adhesive systems have been developed. Among these 100% solids systems are hot melt processable adhesives, including hot melt processable pressure sensitive adhesives. Difficulties have arisen when solvent processing has been replaced by hot melt processing. Often it is difficult to replicate the properties of solvent delivered adhesive layers with hot melt delivered systems. In particular, because the adhesive must pass through the extruder or other hot melt processing equipment, the melt viscosity and the molecular weight of polymers that can be used is restricted. For example, it can be difficult to produce adhesives with high shear properties due to the molecular weight restrictions of hot melt processing.

Disclosed herein are a variety of techniques used either singly or in combination to give hot melt processable pressure sensitive adhesives that replicate the properties of solvent delivered adhesives. As described above, the need to be hot melt processable places restrictions on the properties of adhesives that are hot melt processed that are not present in solvent delivered adhesive systems. It can be particularly difficult to reproduce the properties of solvent delivered adhesives in pressure sensitive adhesives that contain relatively high levels of tackifying resins because the high levels of tackifying resin can reduce the cohesive strength of the polymer matrix and therefore the shear strength of the pressure sensitive adhesive. Foremost among the techniques used to provide improved cohesive strength in the hot melt processable pressure sensitive adhesives of this disclosure is the addition of discontinuous fibers. While not wishing to be bound by theory, it is believed that the fibers reinforce the elastomeric matrix and provide improved cohesive strength. Additional techniques involve, for example, modification of the elastomeric (meth)acrylate random copolymers. These modifications include branching and molecular weight control. Branching can be achieved through the use of multifunctional monomers in quantities not sufficient to give fully crosslinked polymers, and control of molecular weight can be achieved through the use of small amounts of chain transfer agents. Chain transfer agents are known to decrease molecular weight when used, so use of small amounts of chain transfer agents (i.e. amounts less than typically used for that polymer system) gives an increase in molecular weight. Of course, these techniques to give branched and higher molecular weight polymers must be balanced with the need for the polymers to be hot melt processable. Additionally, the elastomeric (meth)acrylate random copolymer matrix can be crosslinked after hot melt processing through the use of co-polymerizable crosslinking agents, especially photochemical crosslinking agents. Each of these techniques will be elaborated in greater detail below.

Besides the detrimental effects of hot melt processing which the methods and adhesives of this disclosure overcome, the hot melt processing can also produce some desirable effects which are not present in solvent delivered adhesives. Examples of these effects are, for example, the absence of bubble defects in the adhesive layer, especially when the adhesive layers are relatively thick, such as, for example, a thickness of 127 micrometers (5 mils). Also, because the molten polymer composition is typically pulled from a die by a moving web, the polymers are partially aligned in the coating direction. The alignment leads to anisotropic properties in the adhesive layer. These anisotropic properties can give increases in, for example, stress relaxation, tensile strength, and even shear holding power, relative to solvent delivered adhesive layers.

Disclosed herein are hot melt processable pressure sensitive adhesives that can be used to prepare a wide range of adhesive tapes and articles. Many of these tapes and articles contain backings or other substrates to support the layer of adhesive. Other adhesive tapes and articles do not contain a backing or substrate layer and therefore are free standing adhesive layers. Double-sided tapes are an example of such an adhesive article. Double-sided tapes, also called "transfer tapes", are adhesive tapes that have adhesive on both exposed surfaces. In some transfer tapes, the exposed surfaces are simply the two surfaces of a single adhesive layer. Other transfer tapes are multi-layer transfer tapes with at least two adhesive layers that may be the same or different, and in some instances intervening layers that may not be adhesive layers. For example, a multi-layer transfer tape may be a 3 layer construction with an adhesive layer, a film layer and another adhesive layer. The film layer can provide handling and/or tear strength or other desirable properties. In this disclosure, double-sided adhesives are prepared that comprise one free standing layer of pressure sensitive adhesive.

Since the double-sided adhesives are free standing, they must have sufficient handling strength to be handled without the presence of a supporting layer. However, in many embodiments it is desirable that the adhesive layer be readily tearable, that is to say that the adhesive layer can be readily torn by hand without requiring the use of a cutting implement such as a knife, scissors, or a razor blade.

The hot melt processable pressure sensitive adhesives disclosed herein are hot melt mixed blends comprising a hot melt processable elastomeric (meth)acrylate random copolymer, and a discontinuous fibrous material. In many embodiments, the hot melt mixed blend also comprises a thermoplastic material. In some embodiments the hot melt processable pressure sensitive adhesives, may also contain one or more tackifying resins. The hot melt processable pressure sensitive adhesives may be "highly tackified" meaning that they contain relatively large amounts of tackifying resin or resins, such as, for example greater than 50 parts by weight of tackifying resin per 100 parts by weight of hot melt processable elastomeric (meth)acrylate random copolymer.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein. The recitation of numerical ranges by endpoints includes all numbers subsumed within that range (e.g. 1 to 5 includes 1, 1.5, 2, 2.75, 3, 3.80, 4, and 5) and any range within that range.

As used in this specification and the appended claims, the singular forms "a", "an", and "the" encompass embodiments having plural referents, unless the content clearly dictates otherwise. For example, reference to "a layer" encompasses embodiments having one, two or more layers. As used in this specification and the appended claims, the term "or" is generally employed in its sense including "and/or" unless the content clearly dictates otherwise.

The term "adhesive" as used herein refers to polymeric compositions useful to adhere together two adherends. Examples of adhesives are pressure sensitive adhesives.

Pressure sensitive adhesive compositions are well known to those of ordinary skill in the art to possess properties including the following: (1) aggressive and permanent tack, (2) adherence with no more than finger pressure, (3) sufficient ability to hold onto an adherend, and (4) sufficient cohesive strength to be cleanly removable from the adherend. Materials that have been found to function well as pressure sensitive adhesives are polymers designed and formulated to exhibit the requisite viscoelastic properties resulting in a desired balance of tack, peel adhesion, and shear holding power. Obtaining the proper balance of properties is not a simple process.

The term "(meth)acrylate" refers to monomeric acrylic or methacrylic esters of alcohols. Acrylate and methacrylate monomers, oligomers, or polymers are referred to collectively herein as "(meth)acrylates".

The term "random copolymer" refers to polymers prepared from at least two different monomers, wherein the monomers are present in the polymer in a random distribution, that is to say the polymers are not strictly alternating copolymers, periodic copolymers or block copolymers. The term "polymer" as used herein refers to fully formed macromolecules containing repeat units. In this disclosure, mixtures containing polymers are not designed to contain polymerizable monomers, unless the addition of such monomers is explicitly stated.

The term "alkyl" refers to a monovalent group that is a radical of an alkane, which is a saturated hydrocarbon. The alkyl can be linear, branched, cyclic, or combinations thereof and typically has 1 to 20 carbon atoms. In some embodiments, the alkyl group contains 1 to 18, 1 to 12, 1 to 10, 1 to 8, 1 to 6, or 1 to 4 carbon atoms. Examples of alkyl groups include, but are not limited to, methyl, ethyl, n-propyl, isopropyl, n-butyl, isobutyl, tert-butyl, n-pentyl, n-hexyl, cyclohexyl, n-heptyl, n-octyl, and 2-ethylhexyl.

The term "aryl" refers to a monovalent group that is aromatic and carbocyclic. The aryl can have one to five rings that are connected to or fused to the aromatic ring. The other ring structures can be aromatic, non-aromatic, or combinations thereof. Examples of aryl groups include, but are not limited to, phenyl, biphenyl, terphenyl, anthryl, naphthyl, acenaphthyl, anthraquinonyl, phenanthryl, anthracenyl, pyrenyl, perylenyl, and fluorenyl.

The terms "glass transition temperature" and "Tg" are used interchangeable and refer to the glass transition temperature of a material or a mixture. Unless otherwise indicated, glass transition temperature values are determined by Differential Scanning calorimetry (DSC).

Adhesives of this disclosure comprise hot melt mixed blends comprising a hot melt processable elastomeric (meth)acrylate random copolymer, and a discontinuous fibrous material. In many embodiments, the elastomeric (meth)acrylate random copolymer is contained within a thermoplastic pouch. The adhesives comprise a hot melt processable pressure sensitive adhesive. The hot melt mixed blend may further comprise at least one tackifying resin, and in some embodiments comprises greater than 50 parts by weight of tackifying resin per 100 parts by weight of hot melt processable elastomeric (meth)acrylate random copolymer.

A wide range of elastomeric (meth)acrylate random copolymers may be used. Typically the elastomeric (meth)acrylate random copolymers are themselves pressure sensitive adhesives, or can upon addition of tackifying resin form a pressure sensitive adhesive. Therefore, elastomeric (meth)acrylate random copolymers are often referred to herein as adhesives or adhesive polymers. Such polymers are made by polymerization of (meth)acrylate co-monomers as described, for example, in U.S. Pat. No. Re24906 (Ulrich). Often the polymers comprise "reinforcing co-monomers". Reinforcing co-monomers are monomers which as homopolymers that generally have a Tg of 20° C. or greater. Often reinforcing monomers are acidic or basic co-monomers. Generally, as the proportion of reinforcing monomers used in preparing the (meth)acrylate random acidic copolymer increases, the cohesive strength of the resulting adhesive formed from the polymer increases.

Typically, the elastomeric (meth)acrylate random copolymer can be tailored to have a resultant glass transition temperature (Tg) of less than about 0° C. Such copolymers typically are derived from monomers comprising about 40% by weight to about 98% by weight, often at least 70% by weight, or at least 85% by weight, or even about 90% by weight, of at least one alkyl (meth)acrylate monomer that, as a homopolymer, has a Tg of less than about 0° C.

Examples of such alkyl (meth)acrylate monomers are those in which the alkyl groups comprise from about 4 carbon atoms to about 12 carbon atoms and include, but are not limited to, n-butyl acrylate, 2-ethylhexyl acrylate, isooctyl acrylate, isononyl acrylate, isodecyl, acrylate, and mixtures thereof.

Examples of reinforcing co-monomers include (meth)acrylic acid, (meth)acrylamide, substituted acrylamides such as N,N-dimethyl acrylamide, itaconic acid, (meth)acrylonitrile, vinyl acetate, N-vinyl pyrrolidone, isobornyl acrylate, cyano ethyl acrylate, N-vinylcaprolactam, maleic anhydride, hydroxyalkylacrylates, N,N-dimethyl aminoethyl (meth)acrylate, N,N-diethylacrylamide, beta-carboxyethyl acrylate, vinyl esters of neodecanoic, neononanoic, neopentanoic, 2-ethylhexanoic, or propionic acids, vinylidene chloride, styrene, vinyl toluene, and alkyl vinyl ethers. Acrylic acid is particularly suitable. The copolymerizable reinforcing monomers can be used in any suitable proportion as long as the Tg of the resultant (meth)acrylate copolymer is less than about 0° C. Typically the reinforcing monomers comprise about 2% by weight to about 50% by weight, or about 5% by weight to about 30% by weight, of the (meth)acrylate copolymer.

In certain embodiments, the elastomeric (meth)acrylate random copolymer is derived from between about 1 and about 20 weight percent of acrylic acid and between about 99 and about 80 weight percent of at least one of iso-octyl acrylate, 2-ethyl-hexyl acrylate or n-butyl acrylate. In some embodiments, the elastomeric (meth)acrylate random copolymer is derived from between about 2 and about 10 weight percent acrylic acid and between about 90 and about 98 weight percent of at least one of iso-octyl acrylate, 2-ethyl-hexyl acrylate or n-butyl acrylate.

A particularly suitable class of elastomeric (meth)acrylate random copolymers are elastomeric (meth)acrylate random copolymers contained within a thermoplastic pouch. Typically, these copolymers are themselves adhesives. These adhesives and methods for preparing them are described, for example, in U.S. Pat. No. 5,804,610 (Hamer et al.) and U.S. Pat. No. 6,294,249 (Hamer et al.). Polymerization of (meth)acrylate polymers in a pouch provides for very convenient handling and dispensing of these inherently tacky polymers.

The above patent disclosures provide methods for making packaged viscoelastic compositions such as pressure sensitive adhesives, in which the packaging material is retained following polymerization (and thus becomes part of the final product). The methods comprise:

(a) providing a pre-adhesive composition which upon exposure to transmissive energy polymerizes to provide a hot melt processable (meth)acrylate random copolymer adhesive;

(b) substantially surrounding the pre-adhesive composition with a packaging material;

(c) exposing the pre-adhesive composition to transmissive energy capable of polymerizing the pre-adhesive composition; and (d) allowing polymerization of the pre-adhesive composition to occur to provide the hot melt processable (meth)acrylate random copolymer adhesive.

The packaging material is selected such that it does not substantially adversely affect the desired adhesive properties of the hot melt processable (meth)acrylate random copolymer adhesive composition when the hot melt processable (meth)acrylate random copolymer adhesive composition and the packaging material are melted and mixed together. The desired adhesive properties, such as peel strength and shear strength, can be controlled by the choice of pre-adhesive composition, the packaging material, as well as other factors. The pre-adhesive composition preferably polymerizes to provide a thermoplastic hot melt adhesive upon exposure to transmissive energy.

Typically, the pre-adhesive composition is completely surrounded by the packaging material. Generally, from 0.1 to 500 grams of pre-adhesive composition is completely surrounded by the packaging material. The pre-adhesive composition typically has a melting point of 40° C. or less, or even 25° C. or less. The pre-adhesive composition generally has a viscosity at 25° C. of less than 50 centipoise, but the viscosity may be higher, especially if fillers or other additives are present. The pre-adhesive composition may be a monomeric mixture or a pre-polymeric mixture. A pre-polymeric mixture is a syrup formed by the partial polymerization of the monomeric materials that can be polymerized to form a hot melt adhesive. Generally, the pre-polymeric mixture is a monomeric mixture.

Typically, the pre-polymerization mixture comprises 50 to 100 parts by weight of one or more monomeric acrylic or methacrylic esters of non-tertiary alkyl alcohols, with the alkyl groups having from 1 to 20 carbon atoms (e.g., from 3 to 18 carbon atoms). Suitable acrylate monomers include methyl acrylate, ethyl acrylate, n-butyl acrylate, lauryl acrylate, 2-ethylhexyl acrylate, cyclohexyl acrylate, iso-octyl acrylate, octadecyl acrylate, nonyl acrylate, decyl acrylate, isobornyl acrylate, and dodecyl acrylate. Also useful are aromatic acrylates, acrylates containing aryl groups, e.g., benzyl acrylate and cyclobenzyl acrylate.

Optionally, one or more monoethylenically unsaturated co-monomers may be polymerized with the acrylate monomers in amounts from about 0 to 50 parts co-monomer. One class of useful co-monomers includes those sometimes referred to as reinforcing co-monomers, having a homopolymer glass transition temperature greater than the glass transition temperature of the acrylate homopolymer. Examples of suitable co-monomers falling within this class include acrylic acid, acrylamide, methacrylamide, substituted acrylamides such as N,N-dimethyl acrylamide, itaconic acid, methacrylic acid, acrylonitrile, methacrylonitrile, vinyl acetate, N-vinyl pyrrolidone, isobornyl acrylate, cyano ethyl acrylate, N-vinylcaprolactam, maleic anhydride, hydroxyalkylacrylates, N,N-dimethyl aminoethyl (meth) acrylate, N,N-diethylacrylamide, beta-carboxyethyl acrylate, vinyl esters of neodecanoic, neononanoic, neopentanoic, 2-ethylhexanoic, or propionic acids (e.g., available from Union Carbide Corp. of Danbury, Conn. under the designation "Vynates"), vinylidene chloride, styrene, vinyl toluene, and alkyl vinyl ethers.

A second class of useful co-monomers includes those having a homopolymer glass transition temperature less than the glass transition temperature of the acrylate homopolymer. Examples of suitable co-monomers falling within this class include ethoxyethoxy ethyl acrylate (Tg=−71° C.) and methoxypolyethylene glycol 400 acrylate (Tg=−65° C.; available from Shin Nakamura Chemical Co., Ltd. under the designation "NK Ester AM-90G").

Additionally, one or more multifunctional ethylenically unsaturated monomers may be included in the pre-polymerization mixture as branching agents. While the use of such monomers would typically lead to crosslinked polymers that would not be hot melt processable, the use of such monomers in low concentration and together with optional chain transfer agents can lead to highly branched polymers. Examples of such multifunctional ethylenically unsaturated monomers include, for example, multifunctional (meth) acrylate monomers. Multifunctional (meth)acrylates include tri(meth)acrylates and di(meth)acrylates (that is, compounds comprising three or two (meth)acrylate groups). Typically di(meth)acrylate monomers (that is, compounds comprising two (meth)acrylate groups) are used. Useful tri(meth)acrylates include, for example, trimethylolpropane tri(meth) acrylate, propoxylated trimethylolpropane triacrylates, ethoxylated trimethylolpropane triacrylates, tris(2-hydroxy ethyl)isocyanurate triacrylate, and pentaerythritol triacrylate. Useful di(meth)acrylates include, for example, ethylene glycol di(meth)acrylate, diethylene glycol di(meth)acrylate, triethylene glycol di(meth)acrylate, tetraethylene glycol di(meth)acrylate, 1,4-butanediol di(meth)acrylate, 1,6-hexanediol di(meth)acrylate, alkoxylated 1,6-hexanediol diacrylate, tripropylene glycol diacrylate, dipropylene glycol diacrylate, cyclohexane dimethanol di(meth)acrylate, alkoxylated cyclohexane dimethanol diacrylates, ethoxylated bisphenol A di(meth)acrylates, neopentyl glycol diacrylate, polyethylene glycol di(meth)acrylates, polypropylene glycol di(meth)acrylates, and urethane di(meth) acrylates. The branching agent 1,6-hexanediol diacrylate (HDDA) is particularly suitable. Typically the di(meth) acrylate branching agent is used in amounts ranging from 0.001 to 0.05 parts by weight per 100 parts by weight of (meth)acrylate monomers.

Generally, the pre-adhesive composition includes an appropriate initiator. For polymerization by ultraviolet light, a photoinitiator is included. Useful photoinitiators include substituted acetophenones such as benzyl dimethyl ketal and 1-hydroxycyclohexyl phenyl ketone, substituted alpha-ketols such as 2-methyl-2-hydroxypropiophenone, benzoin ethers such as benzoin methyl ether, benzoin isopropyl ether, substituted benzoin ethers such as anisoin methyl ether, aromatic sulfonyl chlorides, and photoactive oximes. The photoinitiator may be used in an amount from about 0.001 to about 5.0 parts by weight per 100 parts of total monomer, preferably from about 0.01 to about 5.0 parts by weight per 100 parts of total monomer, and more preferably in an amount from 0.1 to 0.5 parts by weight per 100 parts of total monomer.

The pre-adhesive mixture may also be polymerized by thermal polymerization. For thermal polymerization, a thermal initiator is included. Thermal initiators useful in the present invention include, but are not limited to azo, peroxide, persulfate, and redox initiators. The thermal initiator may be used in an amount from about 0.01 to about 5.0 parts by weight per 100 parts of total monomer, preferably from 0.025 to 2 weight percent.

A combination of thermal and photoinitiation may also be used to prepare hot melt processable (meth)acrylate random copolymer adhesives. For example, the pre-adhesive composition may be polymerized, e.g., in a reactive extruder, to a certain conversion using a thermal initiator, the resulting composition (still in a pre-adhesive state) combined with packaging material (e.g., in the form of a pouch or shell) and a photoinitiator, and the polymerization completed upon exposure to ultraviolet radiation. Conversely, the initial polymerization may be initiated by a photoinitiator, and the polymerization subsequently completed using a thermal initiator. The thermal and photoinitiator may also be used together, rather than being added sequentially.

In some embodiments, the composition also includes a chain transfer agent to control the molecular weight of the polymer. Chain transfer agents are materials which regulate free radical polymerization and are generally known in the art. Suitable chain transfer agents include halogenated hydrocarbons such as carbon tetrabromide; sulfur compounds such as lauryl mercaptan, butyl mercaptan, ethanethiol, isooctylthioglycolate (IOTG), 2-ethylhexyl thioglycolate, 2-ethylhexyl mercaptopropionate, 2-mercaptoimidazole, and 2-mercaptoethyl ether; and solvents such as ethanol, isopropanol, and ethyl acetate.

The amount of chain transfer agent that is useful depends upon the desired molecular weight and the type of chain transfer agent. Solvents are useful as chain transfer agents, but they generally are not as active as, for example, the sulfur compounds. The chain transfer agent is typically used in amounts from about 0.001 part to about 10 parts by weight per 100 parts of total monomer, and more typically from about 0.005 part to about 0.5 part, and even more typically about 0.01 part.

The pre-adhesive composition may further comprise an effective amount of a crosslinking agent that may be activated after the adhesive has been hot melt processed. Typically, the amount ranges from about 0.01 to about 5.0 parts based upon 100 parts of components (a) plus (b) depending upon the type of crosslinking agent used. The crosslinking agent can be added to the polymerized adhesive before or during hot melt processing, or it can be added to the pre-adhesive composition. When added to the pre-adhesive composition, the crosslinking agent can remain intact as a separate species in the adhesive, or it can be co-polymerized with the monomers. Crosslinking is generally initiated after hot melt processing, and the crosslinking is generally initiated by ultraviolet radiation, or ionizing radiation such as gamma radiation or electron beam (the use of separate crosslinking agents being optional in the case of ionizing radiation). Examples of crosslinking agents that can be added after polymerization and before hot melt processing include multi-functional acrylates such as 1,6-hexanediol-diacrylate and trimethylolpropane triacrylate, and substituted triazines such as 2,4-bis(trichloromethyl)-6-(4-methoxyphenyl)-s-triazine and 2,4-bis(trichloromethyl)-6-(3,4-dimethoxyphenyl)-s-triazine, as described in U.S. Pat.

No. 4,329,384 (Vesley et al.) and U.S. Pat. No. 4,330,590 (Vesley). A class of crosslinking agents that are copolymerizable are the copolymerizable mono-ethylenically unsaturated aromatic ketone comonomers free of ortho-aromatic hydroxyl groups such as those disclosed in U.S. Pat. No. 4,737,559 (Kellen et al.). Specific examples include the copolymerizable photosensitive crosslinkers para-acryloxybenzophenone (ABP), para-acryloxyethoxybenzophenone (AEBP), para-N-(methylacryloxyethyl)-carbamoylethoxybenzophenone, para-acryloxyacetophenone, ortho-acrylamidoacetophenone, acrylated anthraquinones, and the like. The use of such crosslinking agents in the hot melt blends of this disclosure will be discussed further below. Typically photosensitive copolymerizable crosslinking agents are incorporated into the elastomeric (meth)acrylate random copolymer at amounts that range from about 0.01 to about 0.5 parts by weight per 100 parts (meth)acrylate monomers.

An exemplary pre-adhesive composition comprises:
(a) 50 to 100 parts by weight of a polymerizable component comprising at least one acrylic or methacrylic ester of a non-tertiary alkyl alcohol in which the alkyl group contains 1 to 20 (e.g., 3 to 18) carbon atoms;
(b) 0 to 50 parts by weight of a polymerizable component comprising at least one modifying monomer, copolymerizable with component (a) such as acrylic acid, the sum of (a) and (b) amounting to 100 parts by weight;
(c) an effective amount of a polymerization initiator;
(d) an effective amount of a branching agent such as HDDA: and
(e) an effective amount of a copolymerizable photosensitive crosslinker such as ABP. The polymerization initiator is generally a photoinitiator.

Typically, the pre-adhesive composition comprises 100 parts by weight of (meth)acrylate monomers, and may include other copolymerizable monomers. In some embodiments, the pre-adhesive composition comprises 90-99 parts by weight of an acrylate monomer selected from iso-octyl acrylate, 2-ethyl-hexyl acrylate, or butyl acrylate and 1-10 parts by weight of acrylic acid or N,N-dimethyl acrylamide. In some embodiments, the pre-adhesive composition comprises 90-95 parts by weight of an acrylate monomer selected from iso-octyl acrylate, 2-ethyl-hexyl acrylate, or butyl acrylate and 5-10 parts by weight of acrylic acid or N,N-dimethyl acrylamide. In some embodiments, the pre-adhesive composition also includes 0.01-0.5 parts by weight of acryloxybenzophenone (ABP) or acryloxyethoxybenzophenone (AEBP) per 100 parts by weight of (meth)acrylate monomers or even 0.10-0.15 parts by weight of ABP or AEBP, and 0.001-0.05 parts by weight of 1,6-hexanediol diacrylate (HDDA) per 100 parts of (meth)acrylate monomers or even 0.006 parts by weight of HDDA.

The pre-adhesive composition may comprise additional non-polymerizable additives to modify the properties of the formed polymer. Examples of such additives include tackifying resins, plasticizers, fillers, pigments, antioxidants, and the like. Such additives, if desired, are typically not added to the pre-adhesive composition, but are added during the hot melt mixing to form the hot melt blend containing the hot melt processable elastomeric (meth)acrylate random copolymer, as will discussed in greater detail below.

The packaging material is made of a material that when combined with the adhesive does not substantially adversely affect the desired adhesive characteristics. The packaging material generally melts at or below the processing temperature of the adhesive (i.e., the temperature at which the adhesive flows). The packaging material typically has a melting point of 200° C. or less, more typically 170° C. or less. In some embodiments, the melting point ranges from 90° C. to 150° C. The packaging material may be a flexible thermoplastic polymeric film. The packaging material is typically selected from ethylene-vinyl acetate, ethylene-acrylic acid, polypropylene, polyethylene, polybutadiene, or ionomeric films. In some embodiments, the packaging material is an ethylene-acrylic acid or ethylene-vinyl acetate film. Typically the films used to form the package range in thickness from about 0.01 mm to about 0.25 mm or even from about 0.025 mm to about 0.127 mm. Thinner films may be desirable to heat seal quickly and minimize the amount of film material used.

The amount of packaging material depends upon the type of material and the desired end properties. The amount of packaging material typically ranges from about 0.5 percent to about 20 percent of the total weight of the pre-adhesive composition and the packaging material, or between 2 percent and 15 percent by weight, or even between 3 percent and 5 percent. Such packaging materials may contain plasticizers, stabilizers, dyes, perfumes, fillers, slip agents, antiblock agents, flame retardants, anti-static agents, microwave susceptors, thermally conductive particles, electrically conductive particles, and/or other materials to increase the flexibility, handleability, visibility, or other useful property of the film, as long as they do not adversely affect the desired properties of the adhesive.

The packaging material should be appropriate for the polymerization method used. For example, with photopolymerization, it is necessary to use a film material that is sufficiently transparent to ultraviolet radiation at the wavelengths necessary to effect polymerization.

Typically, the pouches are prepared from two lengths of thermoplastic film that are heat sealed together across the bottom and on each of the lateral edges on a liquid form-fill-seal machine to form an open ended pouch. The pre-adhesive composition is then pumped through a hose to fill the pouch, and the pouch is then heat sealed across the top to completely surround the pre-adhesive composition.

Generally, the form-fill-seal machine is equipped with an impulse sealer to form the top and bottom seal across the pouches. Such a sealer has one or two sets of jaws that clamp the pouch shut before sealing. A sealing wire is then heated to effect the seal, and the seal is cooled before the jaws are released. The sealing temperature is generally above the softening point and below the melting point of the film used to form the pouch.

During the sealing process, it is desirable to get most of the air out of the pouch before sealing. A small amount of air is tolerable so long as the amount of oxygen is not sufficient to substantially interfere with the polymerization process. For ease of handling, it is desirable to seal the pouches as soon as they are filled with the composition, although immediate sealing is not necessary in all cases. In some cases the pre-adhesive composition can alter the packaging material, and it is desirable to cross-seal the pouches within about one minute of filling, or less. If the pre-adhesive composition decreases the strength of the packaging material, it is desirable to polymerize the composition as soon as possible after the pre-adhesive composition is surrounded by the packaging material. For the combination of acrylate monomers with ethylene acrylic acid, ethylene vinyl acetate, or ionomer films, it is desirable to polymerize the composition within about 24 hours of sealing the pouches.

While thermal polymerization could be used to prepare the hot melt processable (meth)acrylate random copolymer, typically polymerization is effected by exposure to ultraviolet (UV) radiation as described in U.S. Pat. No. 4,181,752

(Martens et al.). In some embodiments, the polymerization is carried out with UV black lights having over 60 percent, or over 75 percent of their emission spectra between 280 to 400 nanometers (nm), with an intensity between about 0.1 to about 25 mW/cm$^2$.

During photopolymerization it is desirable to control the temperature by blowing cooling air around the packaged pre-adhesive composition, by running the packaged pre-adhesive composition over a cooled platen, or by immersing the packaged pre-adhesive composition in a water bath or a heat transfer fluid during polymerization. Typically, the packaged pre-adhesive compositions are immersed in a water bath, with water temperatures between about 5° C. and 90° C., generally below about 30° C. Agitation of the water or fluid helps to avoid hot spots during the reaction.

Typically, after exposing the pre-adhesive composition to transmissive energy and allowing polymerization of the pre-adhesive composition to occur, at least a portion of the pre-adhesive solution has been converted to an adhesive which comprises at least one polymer with a weight average molecular weight of at least 50,000. The weight average molecular weight of the polymerized adhesive composition can range from about 50,000 to about 3,000,000, or from about 100,000 to about 1,800,000, and more typically from about 200,000 to about 1,500,000.

To prepare the hot melt mixed blends of this disclosure, a hot melt processable elastomeric (meth)acrylate random copolymer is hot melt blended with a discontinuous fibrous material. In many embodiments, the hot melt processable elastomeric (meth)acrylate random copolymer is contained within a thermoplastic pouch as described above. The fibrous material provides reinforcing strength to the hot melt processable elastomeric (meth)acrylate random copolymer. For example, the fibers can help to increase the tensile strength of the polymer matrix, and also provide low elongation at break which is desirable to provide adhesives that are tearable. While the fibers are primarily blended with elastomeric (meth)acrylate random copolymer to provide reinforcing strength to the pressure sensitive adhesive, in some embodiments, the fibers can be selected to provide additional beneficial features. For example, if the fibers are electrically conductive, the pressure sensitive adhesive can be antistatic, that is to say, that the adhesive layer helps prevent static charge from building when the adhesive is peeled.

A wide range of discontinuous fibrous materials are suitable for use in this disclosure. Because the fibers are mixed with the elastomeric (meth)acrylate random copolymer to form a hot melt blend, the fibers are chosen such that they are able to withstand the hot melt blending conditions without losing their fibrous state. The fibers are discontinuous, that is to say that they have a finite length and are not continuous strands, and typically are at least 100 micrometers in length. In some embodiments, the fibers are at least one millimeter in length. The fibers may be made from a variety of materials, including: inorganic materials such as glass, ceramic, metals, metal oxides, and the like; synthetic polymeric organic materials such as nylons, acetates, rayons, polyesters, polyolefins such as polyethylene, polypropylene, and copolymers therefrom, polurethanes, acrylics, and the like; and biorenewable fibers such as polylactic acid polymers, cellulose fibers, and chicken feather fibers. The fibers may be used as they are, or they may be treated, such as, for example, surface coated.

Examples of suitable inorganic fibers include glass fibers such as for example, those commercially available from Lauscha Fiber Internation Corp., Summerville, S.C.

Examples of suitable biorenewable fibers include, for example: PLA (polylactic acid) fibers commercially available from MiniFibers Inc., Johnson City, Tenn.; cellulose fibers commercially available from CreaFill Fibers Corp., Chestertown, Md.; and chicken feather fibers commercially available from Tyson Foods Inc., Springdale, Ak.

While a wide array of fiber types are suitable, typically, synthetic organic polymer fibers are most desirable. Suitable polymer fibers have melting points and/or softening points that are above the hot melt processing temperature used to make the hot melt blend. If the melting and/or softening temperature is too close to the processing temperature, it may make the fibers susceptible to melting or softening during hot melt processing which can lead to agglomeration. Particularly suitable are, for example: Nylon 6.6 fibers commercially available from William Barnet & Son LLC, Arcadia, S.C.; polyester fibers, such as PET (poly(ethylene terephthalate)) fibers commercially available from William Barnet & Son LLC, Arcadia, S.C.; and THUNDERON conductive acrylic fibers commercially available from MiniFibers Inc., Johnson City, Tenn. PET fibers are particularly desirable.

The fibers may be added into the hot melt blend at any suitable concentration. Typically, the fibrous material is added to the blend at a level of about 0.1 to 20.0 parts by weight of fibrous material per 100 parts of hot melt processable elastomeric (meth)acrylate random copolymer. In some embodiments, the fibrous material is added to the blend at a level of about 0.5 to 15.0, or even about 1.0 to 11.0 parts by weight of fibrous material per 100 parts of hot melt processable elastomeric (meth)acrylate random copolymer. Some specific embodiments include about 6 parts by weight of fibrous material per 100 parts of hot melt processable elastomeric (meth)acrylate random copolymer.

The hot melt blend prepared from a hot melt processable elastomeric (meth)acrylate random copolymer or the hot melt processable elastomeric (meth)acrylate random copolymer contained within a thermoplastic pouch, and a discontinuous fibrous material, may additionally contain at least one tackifying resin. If used, tackifying resins are added to the hot melt blend (and therefore the adhesive formed therefrom) at levels to give what are called in this disclosure either a "tackified adhesive" (generally about 1-50 parts by weight tackifying resin per 100 parts by weight elastomeric (meth)acrylate random copolymer) or a "highly tackified adhesive" (generally greater than 50 parts by weight tackifying resin per 100 parts by weight elastomeric (meth)acrylate random copolymer).

Typically, (meth)acrylate copolymer-based adhesives require little or no tackifying resins to achieve desired pressure sensitive adhesive properties. The use of high levels of tackifying agent(s) may be desirable because it can increase the tackiness of the pressure sensitive adhesive, making it aggressively adhere to wide range of substrates without the need to apply pressure. This is especially desirable with transfer tapes, in particular transfer tapes that are applied using a mechanical applicator. The addition of tackifying resin, especially high levels of tackifying resin, can detrimentally affect the shear and cohesive strength of a pressure sensitive adhesive, and can raise the Tg of the adhesive. The use of tackifying resins, especially high levels of tackifying resins, can be particularly detrimental to hot melt processable pressure sensitive adhesives where the need to be hot melt processable can already adversely affect the shear strength and cohesive strength properties of the adhesive. However, some embodiments of the adhesives of the present disclosure comprise greater than 50 parts by weight of tackifying resin per 100 parts of (meth)acrylate copolymer. This relatively high level of tackifying resin is achieved without significant negative effects on the shear properties of the adhesive. In some embodiments, the adhesives comprise 55-83 or even 85 parts or more by weight of tackifying resin per 100 parts of (meth)acrylate copolymer.

Suitable tackifying resins include, for example, terpene phenolics, rosins, rosin esters, esters of hydrogenated rosins, synthetic hydrocarbon resins and combinations thereof. Especially suitable tackifying resins include the commercially available tackifying resins: FORAL 3085 (a glycerol ester of highly hydrogenated refined wood rosin) commercially available from Hercules Inc., Wilmington, Del.; and ESCOREZ 2520 (an aliphatic/aromatic hydrocarbon resin) commercially available from ExxonMobil Corp., Houston, Tex.

In some embodiments, especially of highly tackified adhesives, it may be desirable to use a mixture of two tackifying resins, where one of the tackifying resins comprises a high Tg tackifying resin with a glass transition temperature of at least 20° C., and the other comprises a low Tg tackifying resin with a glass transition temperature of no greater than 0° C. Such mixtures of tackifying resins are described, for example, in PCT Patent Publication No. WO 2010/002557 (Ma et al.). The high Tg tackifying resin is typically a solid at room temperature. Examples of suitable high Tg tackifying resin include, for example, terpenes, aliphatic- or aromatic-modified C5 to C9 hydrocarbons, and rosin esters. In some embodiments, lower molecular weight hydrocarbons may be preferred, as compatibility with the (meth)acrylic copolymer decreases as the molecular weight of the hydrocarbon increases. In some embodiments, the weight average molecular weight (Mw) of the high Tg tackifier is between 500 and 2000 gm/mole. In some embodiments, the Mw of the high Tg tackifier is no greater than 1500, in some embodiments no greater than 1000, or even no greater than 800 gm/mole.

The low Tg tackifying resin has a glass transition temperature of no greater than 0° C., in some embodiments, no greater than −10° C., or even no greater than −20° C. Such materials are generally liquids at room temperature. There is no particular lower limit on the glass transition temperature of the low Tg tackifying resin, except that it must be greater than the Tg of the (meth)acrylate copolymer. In some embodiments, the Tg of the low Tg tackifying resin is at least 10° C. greater, at least 20° C. greater, or even at least 30° C. greater than the Tg of the (meth)acrylate copolymer. Generally, lower molecular weight compounds may be more desirable, as compatibility with the acrylic copolymer decreases as the molecular weight of the tackifying resin increases. Exemplary low Tg tackifying resins include terpene phenolic resins, terpenes, aliphatic- or aromatic-modified C5 to C9 hydrocarbons, and rosin esters. In some embodiments, the weight average molecular weight (Mw) of the low Tg tackifier is between 300 and 1500 gm/mole. In some embodiments, the Mw of the low Tg tackifier is no greater than 1000, in some embodiments, no greater than 800, or even no greater than 500 gm/mole.

In some embodiments, the adhesives comprise 35 to 80 parts by weight of the high Tg tackifying resin per 100 parts by weight elastomeric (meth)acrylate random copolymer. In some embodiments, the adhesives comprise at least 40 parts by weight of the high Tg tackifying resin per 100 parts by weight elastomeric (meth)acrylate random copolymer. In some embodiments, the adhesives comprise greater than 50 parts by weight or even at least 60 parts by weight of the high Tg tackifying resin per 100 parts by weight elastomeric (meth)acrylate random copolymer.

In some embodiments, the adhesives comprise 2 to 25 parts by weight of low Tg tackifying resin per 100 parts by weight elastomeric (meth)acrylate random copolymer. In some embodiments, the adhesives comprise at least 5 to 20, or even 5-17 parts by weight low Tg tackifying resin per 100 parts by weight elastomeric (meth)acrylate random copolymer.

A wide variety of commercially available tackifying resins are available and are suitable for use as the high Tg tackifying resin and the low Tg tackifying resin. Especially suitable High Tg tackifying resins include the commercially available tackifying resins: FORAL 3085 and FORAL 85LB resins commercially available from Hercules Inc., Wilmington, Del.; and SP-553 from Schenectady International, Schenectady, N.Y., with FORAL 3085 being especially desirable. Especially suitable Low Tg tackifying resins include the commercially available tackifying resins: ESCOREZ 2520 commercially available from ExxonMobil Corp., Houston, Tex., STAYBELITE Ester 3-E commercially available from Eastman Chemical, Kingsport, Tenn., PICCOLYTE AO commercially available from Hercules, Inc., Wilimington, Del., and HERCOLYN D commercially available from Hercules, Inc., Wilimington, Del., with ESCOREZ 2520 being especially desirable.

The hot melt blend prepared from a hot melt processable elastomeric (meth)acrylate random copolymer and a discontinuous fibrous material, may additionally contain other additives in addition to, or instead of, the tackifying resins described above, as long as the additives do not adversely affect the adhesive properties of the pressure sensitive adhesive. These additives may include, for example, plasticizers, crosslinkers, UV stabilizers, antistatic agents, colorants, antioxidants, fungicides, bactericides, organic and/or inorganic filler particles, and the like.

Optionally, low levels of plasticizer (e.g., less than about 10 parts by weight) may be added to the hot melt blend. A wide variety of commercially available materials described as "plasticizers" are suitable, as long as the added plasticizer is compatible with the other components of the hot melt blend. Representative plasticizers include polyoxyethylene aryl ether, dialkyl adipate, 2-ethylhexyl diphenyl phosphate, t-butylphenyl diphenyl phosphate, di(2-ethylhexyl) adipate, toluenesulfonamide, dipropylene glycol dibenzoate, polyethylene glycol dibenzoate, polyoxypropylene aryl ether, dibutoxyethoxyethyl formal, and dibutoxyethoxyethyl adipate. Especially suitable is the plasticizer SANTICIZER 141 (2-ethylhexyl diphenyl phosphate) commercially available from Ferro Corp., Cleveland, Ohio.

In order to increase the shear or cohesive strength of the pressure sensitive adhesive, a crosslinking additive may be incorporated into the hot melt blend. Many typical crosslinking additives are not suitable because they are thermally activated and can react during hot melt processing and prevent the adhesive from being processed. Suitable crosslinking additives, therefore, are able to be hot melt processed without being activated, but are activatable after hot melt processing has been completed.

Examples of such crosslinking additives include photosensitive crosslinkers that are activated by high intensity ultraviolet (UV) light. It is convenient, in some embodiments, to copolymerize the photosensitive crosslinker into the elastomeric (meth)acrylate random copolymer. For example, if the polymer is prepared in a pouch, the photosensitive copolymerizable crosslinker can be included in the pouch with the polymer precursor, so that the photosensitive crosslinker can be copolymerized into the (meth)acrylate random copolymer. Therefore, the photosensitive crosslinker should not be activated by the UV light used to polymerize the (meth)acrylate random copolymer. Examples of suitable photosensitive crosslinkers that can be copolymerized into the (meth)acrylate random copolymer are ABP (4-acryloxybenzophenone) and AEBP (acryloxyethoxybenzophenone). Other photocrosslinkers that can be added to the hot melt blend for activation after the hot melt blend is processed and subsequently activated by UV light are benzophenone, tert-butylanthrazuinone, and triazines, for example 2,4-bis(trichloromethyl)-6-(4-methoxy-phenyl)-s-triazine. These crosslinkers are activated by UV light generated from artificial sources such as medium pressure mercury lamps or a UV blacklight.

Crosslinker is typically present from 0 to about 0.5 parts by weight based on 100 parts by weight of (meth)acrylate random copolymer. An especially suitable crosslinker is ABP, which may be copolymerized into the (meth)acrylate random copolymer in the pouch, for example.

In addition to the use of added photosensitive crosslinkers, crosslinking may also be achieved using high-energy electromagnetic radiation such as gamma or e-beam radiation. In this case, no crosslinking additive may be required.

The hot melt blends described above are used to form pressure sensitive adhesives upon completion of the hot melt blending process. The pressure sensitive adhesives comprise, as described above, a hot melt processable elastomeric (meth)acrylate random copolymer, and a discontinuous fibrous material. In many embodiments, the pressure sensitive adhesive also comprises a thermoplastic material. The thermoplastic material is the residual material from the thermoplastic pouch and is dispersed relatively randomly throughout the pressure sensitive adhesive. The pressure sensitive adhesive may additionally comprise at least one tackifying resin. In some embodiments, the pressure sensitive adhesive comprises greater than 50 parts by weight of at least one tackifying resin per 100 parts by weight of elastomeric (meth)acrylate random copolymer. In some embodiments, especially embodiments with greater than 50 parts by weight of at least one tackifying resin per 100 parts by weight of elastomeric (meth)acrylate random copolymer, the pressure sensitive adhesive comprises a mixture of two tackifying resins, where one of the tackifying resins comprises a high Tg tackifying resin with a glass transition temperature of at least 20° C., and the other comprises a low Tg tackifying resin with a glass transition temperature of no greater than 0° C. As described above, the pressure sensitive adhesive may also comprise other optional additives, for example, plasticizers, crosslinkers, UV stabilizers, antistatic agents, colorants, antioxidants, fungicides, bactericides, organic and/or inorganic filler particles, and the like.

The pressure sensitive adhesives of this disclosure may be prepared by a variety of hot melt techniques. Generally, the methods comprise providing a hot melt mixing apparatus, providing an elastomeric (meth)acrylate random copolymer or an elastomeric (meth)acrylate random copolymer in a thermoplastic pouch, providing a discontinuous fibrous material, adding the elastomeric (meth)acrylate random copolymer or the elastomeric (meth)acrylate random copolymer in a thermoplastic pouch and discontinuous fibrous material to the hot melt mixing apparatus to prepare a hot melt processable mixture, mixing the hot melt processable mixture to form a hot melt blend, removing the blend from the hot melt mixing apparatus, and forming a hot melt processable pressure sensitive adhesive. As described above a variety of additional additives can be included in the hot melt blend including one or more tackifying resins, plasticizers, crosslinkers, UV stabilizers, antistatic agents, colorants, antioxidants, fungicides, bactericides, organic and/or inorganic filler particles, and the like.

A variety of hot melt mixing techniques using a variety of hot melt mixing equipment are suitable for preparing the pressure sensitive adhesives of this disclosure. Both batch and continuous mixing equipment may be used. Examples of batch methods include those using a BRABENDER (e.g. a BRABENDER PREP CENTER, commercially available from C.W. Brabender Instruments, Inc.; South Hackensack, N.J.) or BANBURY internal mixing and roll milling equipment (e.g. equipment available from Farrel Co.; Ansonia, Conn.). Examples of continuous methods include single screw extruding, twin screw extruding, disk extruding, reciprocating single screw extruding, and pin barrel single screw extruding. Continuous methods can utilize distributive elements, pin mixing elements, static mixing elements, and dispersive elements such as MADDOCK mixing elements and SAXTON mixing elements. A single hot melt mixing apparatus may be used, or a combination of hot melt mixing equipment may be used to prepare the hot melt blends and the pressure sensitive adhesives of this disclosure. In some embodiments, it may be desirable to use more than one piece of hot melt mixing equipment. For example, one extruder, such as, for example, a single screw extruder, can be used to hot melt process the hot melt processable elastomeric (meth)acrylate random copolymer contained within a thermoplastic pouch. The output of this extruder can be fed into a second extruder, for example, a twin screw extruder for hot melt mixing with the additional components.

The output of the hot melt mixing is coated onto a substrate to form an adhesive layer. If a batch apparatus is used, the hot melt blend can be removed from the apparatus and placed in a hot melt coater or extruder and coated onto a substrate. If an extruder is used to prepare the hot melt blend, the blend can be directly extruded onto a substrate to form an adhesive layer in a continuous forming method. In the continuous forming method, the adhesive can be drawn out of a film die and subsequently contacted to a moving plastic web or other suitable substrate. If the adhesive is to be part of a tape, the substrate may be a tape backing. In some methods, the tape backing material is coextruded with the adhesive from a film die and the multilayer construction is then cooled to form the tape in a single coating step. If the adhesive is to be a transfer tape, the adhesive layer may be a free standing film and the substrate may be a release liner or other releasing substrate. After forming, the adhesive layer or film can be solidified by quenching using both direct methods (e.g. chill rolls or water batch) and indirect methods (e.g. air or gas impingement).

If it is desired to crosslink the pressure sensitive adhesive layer, the adhesive layer can the subjected to a crosslinking process. If a photosensitive crosslinker is present, such as ABP, the adhesive layer can be exposed to high intensity UV lamps to effect crosslinking. If no crosslinker is present, crosslinking may be achieved by exposing the adhesive layer to high-energy electromagnetic radiation such as gamma or e-beam radiation.

The methods described in this disclosure may be used to form a variety of adhesive articles. Among these adhesive articles are tapes, including transfer tapes. As described above, transfer tapes are free standing adhesive films with adhesive on both exposed surfaces. Transfer tapes are widely used in the printing and paper making industries for making flying splices, as well being used for a variety of bonding, mounting, and matting applications both by industry and by consumers.

Transfer tapes can be prepared by hot melt coating the hot melt blends described above onto a release surface such as a release liner. "Release liners" are well known film articles that have a low affinity for adhesives, especially pressure sensitive adhesives. A wide variety of release liners are known and are suitable for use with the pressure sensitive adhesives of this disclosure. Exemplary release liners include those prepared from paper (e.g., Kraft paper) or polymeric material (e.g., polyolefins such as polyethylene or polypropylene, ethylene vinyl acetate, polyurethanes, polyesters such as polyethylene terephthalate, and the like). At least some release liners are coated with a layer of a release agent such as a silicone-containing material or a fluorocarbon-containing material. Exemplary release liners include, but are not limited to, liners commercially available from CP Film (Martinsville, Va.) under the trade designation "T-30" and "T-10" that have a silicone release coating on polyethylene terephthalate film. The liner can have a microstructure on its surface that is imparted to the adhesive to form a microstructure on the surface of the adhesive layer. The liner can then be removed to expose an adhesive layer having a microstructured surface.

In many transfer tape embodiments, it is desirable that the transfer tape be hand tearable, that is to say that the dispensed adhesive can be torn by hand without the need for cutting of the transfer tape. This is particularly true when the transfer tape is dispensed from a bladeless hand held dispenser, such as the SCOTCH ATG dispensers commercially available from 3M Company, St. Paul, Minn. While not wishing to be bound by theory, it is believed that the fibrous materials present in the pressure sensitive adhesive reinforce the pressure sensitive adhesive to give it the handling strength required of transfer tape while the discontinuous nature of the fibrous reinforcing materials permit the transfer tape to be hand tearable.

The present disclosure includes the following embodiments.

Among the embodiments are adhesives comprising hot melt blends. A first embodiment includes an adhesive comprising a hot melt mixed blend comprising: a hot melt processable elastomeric (meth)acrylate random copolymer; and a discontinuous fibrous material; wherein the hot melt blend comprises a hot melt processable pressure sensitive adhesive.

Embodiment 2 is the adhesive of embodiment 1, wherein the hot melt processable elastomeric (meth)acrylate random copolymer is contained within a thermoplastic pouch.

Embodiment 3 is the adhesive of embodiment 1 or 2, wherein the hot melt mixed blend further comprises at least one tackifying resin.

Embodiment 4 is the adhesive of embodiment 3, comprising greater than 50 parts by weight of tackifying resin per 100 parts by weight of hot melt processable elastomeric (meth)acrylate random copolymer.

Embodiment 5 is the adhesive of any of embodiments 1-4, wherein the hot melt processable elastomeric (meth)acrylate random copolymer comprises a copolymer of at least one (meth)acrylate monomer which as a homopolymer has a Tg of less than 20° C.

Embodiment 6 is the adhesive of embodiment 5, wherein the hot melt processable elastomeric (meth)acrylate random copolymer further comprises a reinforcing monomer, wherein the reinforcing monomer as a homopolymer has a Tg of greater than 20° C.

Embodiment 7 is the adhesive of embodiment 6, wherein the reinforcing monomer comprises acidic or basic functionality.

Embodiment 8 is the adhesive of embodiment 5, wherein the at least one (meth)acrylate monomer comprises an alkyl (meth)acrylate wherein the alkyl group comprises a linear or branched alkyl group with from 1 to about 20 carbon atoms.

Embodiment 9 is the adhesive of any of embodiments 1-8, wherein the hot melt processable elastomeric (meth)acrylate random copolymer comprises a copolymer of iso-octyl acrylate, 2-ethyl-hexyl acrylate, or butyl acrylate and acrylic acid or N,N-dimethylacrylamide.

Embodiment 10 is the adhesive of any of embodiments 1-9, wherein the hot melt processable elastomeric (meth)acrylate random copolymer further comprises a difunctional (meth)acrylate branching agent.

Embodiment 11 is the adhesive of any of embodiments 1-10, wherein the elastomeric (meth)acrylate random copolymer further comprises a photosensitive crosslinker.

Embodiment 12 is the adhesive of any of embodiments 3-4, wherein the at least one tackifying resin comprises a mixture of two tackifying resins, wherein one of the tackifying resins comprises a high Tg tackifying resin with a glass transition temperature of at least 20° C., and the other comprises a low Tg tackifying resin with a glass transition temperature of no greater than 0° C.

Embodiment 13 is the adhesive of any of embodiments 1-12, wherein the discontinuous fibrous material comprises discontinuous fibers with an average length of at least 1 millimeter.

Embodiment 14 is the adhesive of any of embodiments 1-13, wherein the discontinuous fibrous material comprises synthetic organic polymeric fibers.

Embodiment 15 is the adhesive of any of embodiments 1-14, wherein the adhesive comprises 1 to about 20 parts by weight of fibrous material per 100 parts of hot melt processable elastomeric (meth)acrylate random copolymer.

Embodiment 16 is the adhesive of any of embodiments 1-15, wherein the hot melt processable pressure sensitive adhesive comprises a transfer tape.

Among the embodiments are adhesives. Embodiment 17 is an adhesive comprising: a hot melt processable elastomeric (meth)acrylate random copolymer; and a discontinuous fibrous material, wherein the adhesive article comprises a hot melt processable pressure sensitive adhesive.

Embodiment 18 is the adhesive of embodiment 17, further comprising a thermoplastic material.

Embodiment 19 is the adhesive of embodiment 17 or 18, further comprising at least one tackifying resin.

Embodiment 20 is the adhesive of embodiment 19, comprising greater than 50 parts by weight per 100 parts by weight of elastomeric (meth)acrylate random copolymer.

Embodiment 21 is the adhesive of any of embodiments 19-20, wherein the at least one tackifying resin comprises a mixture of two tackifying resins, wherein one of the tackifying resins comprises a high Tg tackifying resin with a glass transition temperature of at least 20° C., and the other comprises a low Tg tackifying resin with a glass transition temperature of no greater than 0° C.

Embodiment 22 is the adhesive of any of embodiments 17-21, wherein the hot melt processable elastomeric (meth)acrylate random copolymer comprises a copolymer of at least one (meth)acrylate monomer which as a homopolymer has a Tg of less than 20° C.

Embodiment 23 is the adhesive of embodiment 22, wherein the hot melt processable elastomeric (meth)acrylate random copolymer further comprises a reinforcing monomer, wherein the reinforcing monomer as a homopolymer has a Tg of greater than 20° C.

Embodiment 24 is the adhesive of embodiment 23, wherein the reinforcing monomer comprises acidic or basic functionality.

Embodiment 25 is the adhesive of embodiment 22, wherein the at least one (meth)acrylate monomer comprises an alkyl (meth)acrylate wherein the alkyl group comprises a linear or branched alkyl group with from 1 to about 20 carbon atoms.

Embodiment 26 is the adhesive of any of embodiments 17-25, wherein the hot melt processable elastomeric (meth)acrylate random copolymer comprises a copolymer of iso-octyl acrylate, 2-ethyl-hexyl acrylate, or butyl acrylate and acrylic acid or N,N-dimethylacrylamide.

Embodiment 27 is the adhesive of any of embodiments 17-26, wherein the hot melt processable elastomeric (meth)acrylate random copolymer further comprises a photosensitive crosslinker.

Embodiment 28 is the adhesive of any of embodiments 17-27, wherein the hot melt processable elastomeric (meth)acrylate random copolymer further comprises a difunctional (meth)acrylate branching agent.

Embodiment 29 is the adhesive of any of embodiments 17-28, wherein the discontinuous fibrous material comprises discontinuous fibers with an average length of at least 1 millimeter.

Embodiment 30 is the adhesive of any of embodiments 17-29, wherein the discontinuous fibrous material comprises synthetic organic polymeric fibers.

Embodiment 31 is the adhesive of any of embodiments 17-30, wherein the adhesive comprises 1 to about 20 parts by weight of fibrous material per 100 parts of hot melt processable elastomeric (meth)acrylate random copolymer.

Embodiment 32 is the adhesive of any of embodiments 17-31, wherein the hot melt processable pressure sensitive adhesive comprises a transfer tape.

Among the embodiments are methods of preparing adhesives. Embodiment 33 is a method of preparing an adhesive comprising: providing a hot melt mixing apparatus; providing an elastomeric (meth)acrylate random copolymer; providing a discontinuous fibrous material; adding the elastomeric (meth)acrylate random copolymer, and discontinuous fibrous material to the hot melt mixing apparatus to prepare a hot melt processable mixture; mixing the hot melt processable mixture to form a hot melt blend; removing the blend from the hot melt mixing apparatus; and forming a hot melt processable pressure sensitive adhesive.

Embodiment 34 is the method of embodiment 33, wherein the elastomeric (meth)acrylate random copolymer is contained within a thermoplastic pouch.

Embodiment 35 is the method of embodiment 33 or 34, wherein the hot melt processable elastomeric (meth)acrylate random copolymer comprises a copolymer of at least one (meth)acrylate monomer which as a homopolymer has a Tg of less than 20° C. and a reinforcing monomer, as a homopolymer has a Tg of greater than 20° C.

Embodiment 36 is the method of embodiment 35, wherein the at least one (meth)acrylate monomer comprises an alkyl (meth)acrylate wherein the alkyl group comprises a linear or branched alkyl group with from 1 to about 20 carbon atoms.

Embodiment 37 is the method of any of embodiments 33-36, wherein the elastomeric (meth)acrylate random copolymer further comprises a difunctional (meth)acrylate branching agent.

Embodiment 38 is the method of embodiment 37, wherein the amount of difunctional (meth)acrylate branching agent ranges is 0.001-0.05 parts by weight per 100 parts by weight of elastomeric (meth)acrylate random copolymer.

Embodiment 39 is the method of any of embodiments 33-38, wherein the hot melt processable elastomeric (meth)acrylate random copolymer comprises a copolymer of iso-octyl acrylate, 2-ethyl-hexyl acrylate, or butyl acrylate and acrylic acid or N,N-dimethylacrylamide.

Embodiment 40 is the method of any of the embodiments 33-39, wherein the elastomeric (meth)acrylate random copolymer further comprises a photosensitive crosslinker.

Embodiment 41 is the method of the embodiment 40, wherein the amount of photosensitive crosslinker is 0.01-0.5 parts by weight per 100 parts by weight of elastomeric (meth)acrylate random copolymer.

Embodiment 42 is the method of any of embodiments 33-41, wherein the hot melt processable mixture further comprises at least one tackifying resin.

Embodiment 43 is the method of embodiment 42, comprising greater than 50 parts by weight per 100 parts by weight of elastomeric (meth)acrylate random copolymer.

Embodiment 44 is the method of any of embodiments 33-43, wherein the hot melt mixing apparatus comprises a hot melt extruder.

Embodiment 45 is the method of any of embodiments 33-44, wherein removing the blend from the hot melt mixing apparatus and forming a pressure sensitive adhesive comprises extruding onto a substrate.

Embodiment 46 is the method of embodiment 45, wherein the substrate comprises a release liner.

Embodiment 47 is the method of any of embodiments 33-46, further comprising crosslinking the formed hot melt processable pressure sensitive adhesive.

Embodiment 48 is the method of any of embodiments 31-47, wherein the formed pressure sensitive adhesive comprises a transfer tape.

Among the embodiments are hot melt coated adhesives. Embodiment 49 comprises a hot melt coated adhesive layer comprising an elastomeric (meth)acrylate random copolymer with a fibrous material dispersed therein, wherein the hot melt coated adhesive layer has anisotropic properties.

Embodiment 50 is the hot melt coated adhesive layer of embodiment 49, further comprising a thermoplastic material.

Embodiment 51 is the hot melt coated adhesive layer of any of embodiments 49-50, further comprising at least one tackifying resin.

Embodiment 52 is the hot melt coated adhesive layer of embodiment 51, wherein the at least one tackifying resin comprises at least 50 parts by weight of tackifying resin per 100 parts by weight of elastomeric (meth)acrylate random copolymer.

EXAMPLES

These examples are merely for illustrative purposes only and are not meant to be limiting on the scope of the appended claims. All parts, percentages, ratios, etc. in the examples and the rest of the specification are by weight, unless noted otherwise. Solvents and other reagents used were obtained from Sigma-Aldrich Chemical Company; Milwaukee, Wis. unless otherwise noted.

Table of Abbreviations

| Abbreviation or Trade Designation | Description |
| --- | --- |
| Tackifier-1 | Tackifying resin, a glycerol ester of highly hydrogenated refined wood rosin, commercially available from Hercules Inc. of Wilmington, DE as "FORAL 3085". |
| Tackifier-2 | Tackifying resin, aliphatic/aromatic hydrocarbon resin, commercially available from ExxonMobil Corp. of Houston, TX as "ESCOREZ 2520". |
| Plasticizer-1 | Plasticizer, 2-ethyl-hexyl diphenyl phosphate commercially available from Ferro Corporation of Cleveland, OH as "SANTICIZER 141". |
| Photoinitiator-1 | Photoinitiator, 2,2-dimethoxy-1,2-diphenylethan-1-one commercially available from Ciba Specialty Chemicals Inc. of Hawthorne, NY as "IRGACURE 651". |
| Antioxidant-1 | Antioxidant, octadecyl-3-(3,5-di-tert-butyl-4-hydroxyphenyl)-propionate commercially available from Ciba Specialty Chemicals Inc. of Hawthorne, NY as "IRGANOX 1076". |
| Film-1 | A 2 mil (51 micrometer) thick primed, poly(ethylene terephthalate) (PET) film commercially available from Mitsubishi Polyester Film, Inc. of Greer, SC as "HOSTAPHAN 3SAB". |
| phr | Parts per hundred parts resin or parts by weight per parts of total monomer. |
| 2-EHA | 2-ethyl-hexyl acrylate |
| AA | Acrylic acid |
| ABP | acryloxybenzophenone |
| HDDA | 1,6-hexanediol diacrylate |
| IOTG | isooctyl thioglycolate, chain transfer agent |
| Fiber-1 | PET fibers poly(ethylene terephthalate) of 1.5 denier, 3 mm nominal length, commercially available from William Barnet & Son, LLC of Arcadia, SC. |
| Fiber-2 | PET fibers, poly(ethylene terephthalate) of 1.5 denier, 6 mm nominal length, commercially available from William Barnet & Son, LLC of Arcadia, SC. |
| Fiber-3 | Nylon fibers, nylon 6.6 fibers of 1.5 denier, 3 mm nominal length, commercially available from William Barnet & Son, LLC of Arcadia, SC. |
| Fiber-4 | Nylon fibers, nylon 6.6 fibers of 1.5 denier, 6 mm nominal length, commercially available from William Barnet & Son, LLC of Arcadia, SC. |
| Fiber-5 | Glass fibers of 0.6 denier, 6 mm nominal length, commercially available from Lauscha Fiber International Corp. of Summerville, SC. |
| Fiber-6 | PLA fibers, polylactic acid fibers of 1.3 denier, 3 mm nominal length. |
| Fiber-7 | Conductive acrylic fibers of 3.0 denier, 6 mm nominal length, commercially available from MiniFibers Inc. of Johnson City, TN, as "THUNDERON" |
| Fiber-8 | Cellulose fibers commercially available from CreaFill Fibers Corporation of Chestertown, MD. |
| Fiber-9 | Chicken feather fibers, commercially available from Tyson Foods Inc. of Springdale, AR. |

Test Methods

Preparation of Samples for Testing:

Samples of pressure sensitive adhesive tapes for testing were prepared by laminating the adhesive tape onto a sheet of Film-1. The laminated adhesives, with the liner intact, were conditioned in a constant temperature and humidity (CTH) room at 23° C. and 50% relative humidity (RH) for at least 18 hours before testing.

Shear Strength on Stainless Steel (SS):

The shear strength was determined following ASTM Designation: D 3654/D 3654M-06. A 0.5 inch (1.3 cm) wide strip of adhesive was laminated (using a 4.5 lb (2.0 kg) roller) onto a stainless steel panel, covering a 0.5 inch by 1 inch (1.3 cm×2.6 cm) area of the panel. A 500 gram weight was used as the static load, and the test samples were placed on an automated timing apparatus in a CTH room (23° C./50% RH). The mode of failure for all samples was cohesive failure. The data is reported as an average of two measurements for each test.

Rolling Ball Tack:

The tack was determined by following ASTM Designation: D3121-06 with a few minor adjustments. A 1 inch by 14 inch (2.6×35.6 cm) strip of adhesive tape was aligned at the bottom of a standard inclined trough. A clean ½ inch (1.3 cm) diameter stainless steel ball is released from the top of the inclined trough and allowed to roll to a stop on the PSA. The distance from the point where the ball initially contacted the adhesive to where the ball stopped was measured. Five measurements were obtained, and the average of the median three values was reported as the rolling ball tack.

90° Peel Adhesion to Stainless Steel and HDPE:

In a CTH room, a 0.5 inch (1.3 cm) wide strip of the adhesive was laminated (using a 4.5 lb (2.0 kg) roller) onto either a stainless steel or a high density polyethylene (HDPE) panel. After a dwell time of 15 minutes, a 90° peel test was performed using a Model SP-102B-3M90 slip/peel tester (manufactured by Instrumentors, Inc., Strongville, Ohio) at 12 inches/min (30 cm/min), with data collected and averaged over 10 seconds, according to the standard tape method testing method ASTM Designation: D3330/D330M-04. Failure modes were noted as in the 180° Peel adhesion test. Data was recorded in ounces/inch and converted to Newtons/decimeter (N/dm).

Elongation at Break and Ultimate Tensile Strength

The tensile strength and elongation of the adhesive was determined according to ASTM Designation: D3759. The elongation at break was measured using an MTS Sintech 500/S tensile tester a clamp separation rate of 50 inches/min (127 cm/min). The elongation was recorded at break, as the percentage of the original effective specimen length. The peak load was reported as the ultimate tensile strength in pounds/inch width (lb/in width) and converted to Newtons/meter (N/m).

Synthesis Examples

Synthesis Example S1

Preparation of Copolymer 1 Hot Melt Pressure Sensitive Adhesive

A copolymer of 2-EHA and AA was bulk polymerized under UV light sealed in ethylene vinyl acetate film pouches as described in U.S. Pat. No. 6,294,249 (Hamer et al.). Two sheets of 2.5 mil (51 micrometer) thick ethylene vinyl acetate, commercially available as VA-24 from Pliant Corp. of Evansville, Ind., were heat sealed on the lateral edges and the bottom to form a rectangular pouch on a liquid form, fill, and seal machine. The pouch was filled with a pre-adhesive composition having 95 parts 2-EHA, 5 parts AA, 0.15 phr of Photoinitiator-1, 0.15 phr ABP, 0.4 phr Antioxidant-1, 0.006 phr HDDA branching monomer/crosslinker, and 0.01 phr of IOTG chain transfer agent. The filled package was then heat sealed at the top in the cross direction through the monomer to form individual pouches measuring 13.4 cm by 4.3 cm by about 0.4 cm thick containing 27 grams of the pre-adhesive composition. The pouches were placed in a water bath that was maintained between about 16° C. and 32° C. and exposed to ultraviolet radiation (supplied by lamps having about 90 percent of the emissions between 300 and 400 nanometers (nm), and a peak emission at 351 nm) at an intensity of 4.55 mW/cm$^2$ for 21 minutes.

Comparative Example C1

Comparative Example 1 was a solvent-coated 5 mil (0.13 mm) thick transfer tape, available as 950 Adhesive Transfer Tape from 3M Company, Saint Paul, Minn.

Example 1

A 30 mm diameter co-rotating twin screw extruder, available as "ZSK-30" from Werner & Pfleiderer, Ramsey, N.J., was used to prepare a pressure sensitive adhesive coated tape. The twin screw extruder had 12 zones, each corresponding to one twelfth of the length of the screw, and a length to diameter ratio of 36:1. The twin screw extruder was operated at 300 rpm at 200-230° F. (93-110° C.). Copolymer 1 in pouches was fed into a 2 inch (51 mm) Single Packer Extruder commercially available from Bonnot, Uniontown, Ohio. The Single Packer Extruder masticated the polymer and fed it into zone 2 of the twin screw extruder at a rate of 50.1 grams/minute. Fiber-5 was fed from a funnel on a KT20 Twin Screw Compact Loss-in-Weight Feeder (K-Tron Process Group, Pitman, N.J.) at a rates of 2.3 grams/minute into zone 1 of the twin screw extruder to give an adhesive fiber content of about 3% by weight. Pressurized air was used to mitigate fiber clumping at the feeder exit. Tackifier-2 was fed at a rate of 5.0 grams/minute into zone 1 of the extruder from a Dynamelt S Series Adhesive Supply Unit from ITW Dynatec, Hendersonville, Tenn., set at 250° F. (121° C.). Tackifier-1 was fed via a split stream at a rate of 9.2 grams/minute into zone 4 and at a rate of 19.9 grams/minute into zone 6 of the extruder from a Dynamelt S Series Adhesive Supply Unit, set at 300° F. (149° C.). Plasticizer-1 was drip fed at 0.4 gram/minute into zone 8 of the twin screw extruder from a B-9000 gear pump from ZENITH pumps, Monroe, N.C. The melt mixture passed from the extruder into a polymer melt pump set at 350° F. (177° C.) (commercially available as "PEP-II 3 cc/rev" from Zenith Pumps of Monroe, N.C.) which pumped it at a rate of 2.92 cm$^3$/revolution into a rotary rod die set to 325° F. (163° C.). The melt mixture was coated onto a silicone-coated, densified kraft paper release liner as a continuous sheet of pressure sensitive adhesive having about 5 mil (0.13 mm) thickness. The coated PSA was then crosslinked by UV irradiation, using a medium pressure mercury lamp, with a dose of 50 mJ/cm$^2$ UVC, as measured by a UV Power Puck from EIT, Inc. (Sterling, Va.). Samples were tested for tensile strength and percent elongation at break using the test methods described above, the results are shown in Table 1. Adhesive properties were then measured using the test methods described above and are reported in Table 2.

Examples 2-10 and Comparative Example C2

Examples 2-10 and Comparative Example C2 were prepared as described in Example 1, using the fibers and fiber amounts shown in Table 1. The adhesive composition for each Example was 100 parts of polymer, 71 phr Tackifier-1, 12.5 phr Tackifier-2, and 1 phr of Plasticizer-1. Adhesive properties were then measured and are reported in Table 2.

TABLE 1

| Example | Added Fibers | Fiber Amount (wt %) | Tensile Strength lb/in (N/m) | Elongation at Break (%) |
|---|---|---|---|---|
| C1 | NA | — | 7.3 (1,278) | 24 |
| C2 | 0 | — | 1.5 (263) | 224.1 |
| 1 | Fiber-5 | 3 | 2.8 (490) | 275.3 |
| 2 | Fiber-1 | 3 | 3.7 (648) | 103.2 |
| 3 | Fiber-2 | 3 | 5.7 (998) | 57 |
| 4 | Fiber-3 | 3 | 2.0 (350) | 125.9 |
| 5 | Fiber-4 | 3 | 4.1 (718) | 68.7 |
| 6 | Fiber-7 | 3 | 4.9 (858) | 45.5 |
| 7 | Fiber-7 | 6 | 9.7 (1,699) | 21.7 |
| 8 | Fiber-6 | 3 | 2.2 (385) | 366.5 |
| 9 | Fiber-8 | 3 | 1.9 (333) | 429.6 |
| 10 | Fiber-9 | 3 | 3.1 (543) | 214.4 |

NA = Not applicable

TABLE 2

| Example | Shear Strength (minutes) | Rolling Ball Tack (mm) | 90° Peel on SS oz/in (N/dm) | 90° Peel on HDPE oz/in (N/dm) |
|---|---|---|---|---|
| C1 | 805.5 | 10 | 78.6 (86.0) | 29.2 (31.9) |
| C2 | 1358.0 | 5 | 134.1 (146.7) | 54.5 (59.6) |
| 1 | 2066.0 | 13 | 95.7 (104.7) | 45.3 (49.6) |
| 2 | 666.5 | 16 | 80.8 (88.4) | 34.8 (38.1) |
| 3 | 729.0 | 23 | 98.3 (107.5) | 26.6 (29.1) |
| 4 | 774.0 | 5 | 74.4 (81.4) | 21.6 (23.6) |
| 5 | 1085.5 | 8 | 78.7 (86.1) | 24.5 (26.8) |
| 6 | 239.0 | 11 | 80.0 (87.5) | 32.3 (35.3) |
| 7 | 211.0 | 21 | 73.9 (80.8) | 25.2 (27.6) |
| 8 | 531.0 | 18 | 97.2 (106.3) | 50.9 (55.7) |
| 9 | 2797.0 | 10 | 138.1 (151.1) | 39.8 (43.5) |
| 10 | 673.0 | 12 | 78.7 (86.1) | 28.9 (31.6) |

What is claimed is:
1. A method of preparing an adhesive comprising:
providing a hot melt mixing apparatus;
providing an elastomeric (meth)acrylate random copolymer;
providing a discontinuous fibrous material;
adding the elastomeric (meth)acrylate random copolymer, and separately adding the discontinuous fibrous material to the hot melt mixing apparatus to prepare a hot melt processable mixture;
mixing the hot melt processable mixture to form a hot melt blend;
removing the blend from the hot melt mixing apparatus; and
forming a hot melt processable pressure sensitive adhesive,
wherein the discontinuous fibrous material has a length of 6 mm or less and a denier between 0.6 and 3.0; and
wherein the discontinuous fibrous material is selected from the group consisting of: polyethylene terephthalate (PET), nylon, polylactic acid, cellulose fibers, and chicken feather fibers.

2. The method of claim 1, wherein the elastomeric (meth)acrylate random copolymer is contained within a thermoplastic pouch.

3. The method of claim 1, further comprising adding at least one tackifying resin to the hot melt blend.

4. The method of claim 3, wherein the at least one tackifying resin comprises greater than 50 parts by weight per 100 parts by weight of elastomeric (meth)acrylate random copolymer.

5. The method of claim 1, wherein the hot melt processable elastomeric (meth)acrylate random copolymer comprises a copolymer of at least one (meth)acrylate monomer which as a homopolymer has a Tg of less than 20° C. and a reinforcing monomer, as a homopolymer has a Tg of greater than 20° C.

6. The method of claim 5, wherein the at least one (meth)acrylate monomer comprises an alkyl (meth)acrylate wherein the alkyl group comprises a linear or branched alkyl group with from 1 to about 20 carbon atoms.

7. The method of claim 1, wherein the elastomeric (meth)acrylate random copolymer further comprises a difunctional (meth)acrylate branching agent.

8. The method of claim 1, wherein the hot melt processable elastomeric (meth)acrylate random copolymer comprises a copolymer of (i) iso-octyl acrylate, 2-ethyl-hexyl acrylate, or butyl acrylate and (ii) acrylic acid or N,N-dimethylacrylamide.

9. The method of claim 1, wherein the elastomeric (meth)acrylate random copolymer further comprises a photosensitive crosslinker.

10. The method of claim 3, wherein the at least one tackifying resin comprises a mixture of two tackifying resins, wherein one of the tackifying resins comprises a high Tg tackifying resin with a glass transition temperature of at least 20° C., and the other comprises a low Tg tackifying resin with a glass transition temperature of no greater than 0° C.

11. The method of claim 1, wherein the discontinuous fibrous material comprises discontinuous fibers with an average length of at least 1 millimeter.

12. The method of claim 1, wherein the adhesive comprises 1 to about 20 parts by weight of fibrous material per 100 parts of hot melt processable elastomeric (meth)acrylate random copolymer.

13. The method of claim 1, wherein the hot melt processable pressure sensitive adhesive comprises a transfer tape.

14. The method of claim 1, wherein removing the hot melt blend from the hot melt mixing apparatus and forming a hot melt processable pressure sensitive adhesive comprises hot melt coating onto a release liner.

15. The method of claim 1, further comprising crosslinking the formed hot melt processable pressure sensitive adhesive.

16. The method of claim 1, wherein the discontinuous fibrous material is selected from the group consisting of: cellulose fibers.

17. The method of claim 1, wherein the discontinuous fibrous material is selected from the group consisting of: chicken feather fibers.

18. The method of claim 1, wherein the discontinuous fibrous material is selected from the group consisting of polyethylene terephthalates (PET).

19. The method of claim 1, wherein the discontinuous fibrous material is selected from the group consisting of nylon.

20. The method of claim 1, wherein the discontinuous fibrous material is selected from the group consisting of polylactic acids (PLA).

* * * * *

UNITED STATES PATENT AND TRADEMARK OFFICE
CERTIFICATE OF CORRECTION

PATENT NO.        : 9,695,343 B2
APPLICATION NO.   : 13/876605
DATED             : July 4, 2017
INVENTOR(S)       : Andrew Satrijo It is certified that error appears in the above-identified patent and that said Letters Patent is hereby corrected as shown below:

In the Specification

Column 4
Line 59, delete "calorimetry" and insert -- Calorimetry --

Column 11
Line 60, delete "polurethanes," and insert -- polyurethanes, --
Line 67, delete "Internation" and insert -- International --

Column 14
Line 24, delete "Willimington," and insert -- Wilmington, --
Line 25, delete "Willimington," and insert -- Wilmington, --

Column 15
Line 11, delete "tert-butylanthrazuinone," and insert -- tert-butylanthraquinone, --

Column 22
Line 37, delete "Strongville," and insert -- Strongsville --

Signed and Sealed this
Second Day of January, 2018

Joseph Matal
*Performing the Functions and Duties of the
Under Secretary of Commerce for Intellectual Property and
Director of the United States Patent and Trademark Office*